Aug. 28, 1945.                 W. HOMAN ET AL                 2,383,550
                              MEASURING DEVICE
                           Filed April 21, 1942              2 Sheets-Sheet 2
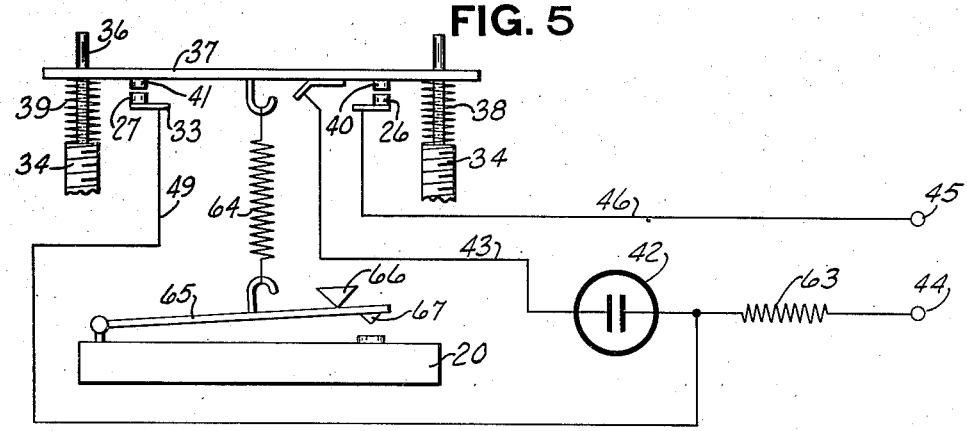
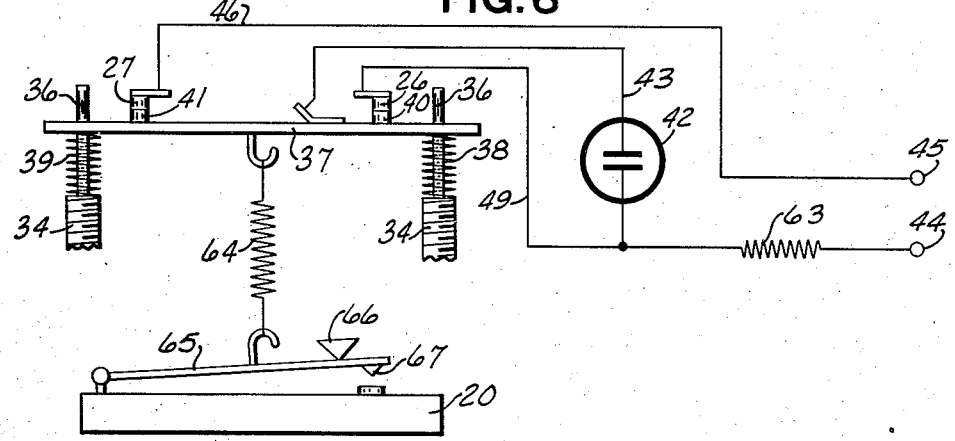
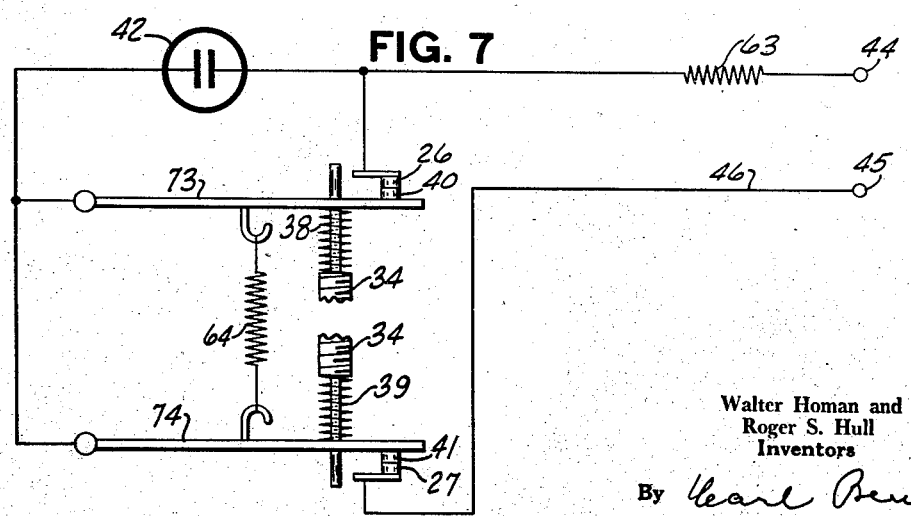
Walter Homan and
Roger S. Hull
Inventors
By *(signature)*
Their Attorney Patented Aug. 28, 1945

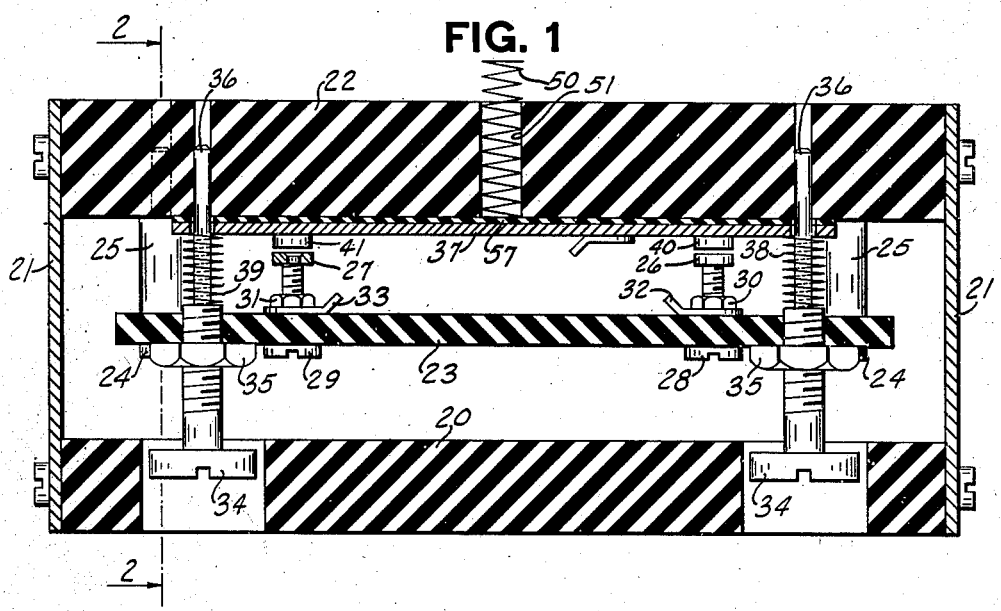

2,383,550

UNITED STATES PATENT OFFICE 2,383,550

MEASURING DEVICE

Walter Homan and Roger S. Hull, Dayton, Ohio, assignors to The National Cash Register Company, Dayton, Ohio, a corporation of Maryland Application April 21, 1942, Serial No. 439,912

10 Claims. (Cl. 177—311)

This invention relates to a spring strength gauging device.

The principal object of the invention is to provide a simple and easily operable device to gauge the strength of springs for minimum and maximum limits of strength, both limits to be gauged by a single operation.

Another object of the invention is to provide a switch means to gauge the strength of springs, which means operates to close a set of contacts when the strength of the spring under test exceeds the lowest acceptable strength, and which operates to close another set of contacts when the strength of the spring under test exceeds the highest acceptable strength.

Another object of the invention is to provide a spring gauging device having an indicator to indicate when the strength of a spring under test falls within the range of acceptable strengths.

Another object of the invention is to provide a spring gauging device to detect springs which fall within an acceptable range of strengths.

A specific object of the invention is to provide an electric switch mechanism operable by a spring under test when the strength of the spring under test exceeds the lowest acceptable strength, to operate a signal device, and to again operate the signal device when the strength of the spring under test exceeds the highest acceptable strength.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a cross sectional view of the spring gauging device.

Fig. 2 is a sectional view of the spring gauging device, taken on line 2—2 of Fig. 1.

Fig. 3 is a detail view, in cross section, of one form of means for operating the spring gauging device.

Fig. 4 is a wiring diagram for the gauging device shown in Figs. 1, 2, and 3.

Figs. 5, 6, and 7 are schematic diagrams of other forms of the invention.

General description

The invention illustrated herein comprises a device for gauging the strength of springs made according to a given specification. It is generally known that springs made according to specification will vary in strength, even though they are made from materials having the same general characteristics. However, in intricate mechanisms, only springs coming within a specific range of strength are acceptable. The device illustrated herein is provided to detect the springs coming within this acceptable range.

The acceptable range of strength includes a minimum strength and a maximum strength. In the device illustrated, an electric circuit is provided which includes a glow-discharge tube so connected to a switch means that, when a spring exceeds the minimum of acceptable strength, the switch means closes the circuit through the glow-discharge tube, which causes the tube to glow. The circuit is also provided with switch contacts which are closed when the strength of the spring tested exceeds the maximum acceptable strength. The closing of this latter switch closes a circuit around the glow-discharge tube in such a manner as to drop the voltage passing through the tube to a point such that the tube no longer glows. Thus, in the testing of a spring, if the glow-discharge tube glows, the spring is in the acceptable range, but if the tube glows for an instant and then goes out, the spring being tested is too strong to be acceptable. On the other hand, if, when a spring is being tested, the tube does not glow at all, then the spring is too weak to be acceptable.

The above operation of the switch mechanism is accomplished, in one form of the invention, by providing a floating switch member having two contact points, said floating member being supported at each end by a spring of a predetermined strength. The spring to be tested is placed on the floating switch member and compressed a predetermined extent. If the spring being tested exceeds the minimum range of strength, one end of the floating switch member is lowered to bring the corresponding switch point into contact with a stationary switch point to thereby complete a circuit through the glow-discharge tube. If the spring exceeds the maximum range of strength, the other end of the switch member is lowered to bring the corresponding switch point into contact with an associated switch point to close another circuit, this circuit bypassing the tube and being so arranged as to decrease the tube current to thereby extinguish the glow of the tube. If the spring being tested is too weak to depress either end of the floating switch member, neither of the two circuits will be closed, and therefore the tube will not glow.

Detailed description

The device is supported by a base 20 (Figs. 1 and 2). Side walls 21 secured to the base 20 and to a top member 22 form an enclosure for the switch mechanism and a support for the top member 22. A stationary intermediate plate 23 is supported beneath the top member 22 by four screws 24, which pass through spacing collars 25 and into threaded openings in the top member 22. The intermediate plate 23 carries stationary switch contacts 26 and 27, formed at the upper ends of screws 28 and 29, respectively. Each screw 28 and 29 is screwed into a threaded opening in the intermediate plate 23. Lock nuts 30 and 31 securely maintain terminal clips 32 and 33, respectively, in place on the screws 28 and 29, respectively.

Also carried by the intermediate plate 23, at each end thereof, is a shouldered screw 34. The screws 34 are held in place on the intermediate plate by lock nuts 35 and are provided with reduced ends which form pilots 36 projecting into openings in the top member 22.

A switch plate 37 is supported at its left-hand end (Fig. 1) by a spring 39 and at its right-hand end by a spring 38. The spring 39 is of greater strength than the strength of the spring 38, for a purpose presently described. However, the weight of the switch plate is not sufficient to overcome the resistance of the springs 38 and 39, and therefore the switch plate normally remains in a horizontal position against the under side of the top member 22, wherein contact points 40 and 41 are held out of engagement with the contacts 26 and 27, respectively.

The switch plate 37 is provided with an opening at each end thereof to slide on the pilots 36 of the screws 34.

The switch plate 37 is connected to a glow-discharge tube 42 by a lead 43, and a resistance 63 is connected between the tube 42 and one side 44 of the power supply line. The other side 45 of the power supply line is connected, by a lead 46, to the terminal clip on screw 28, the latter having mounted thereon the switch contact 26. Thus, closing the contacts 26—40 closes a circuit through the tube 42 to cause the tube to glow.

The switch contact 27 is connected to side 44 of the power supply line by a lead 49 at a point between the tube 42 and the resistance 63, so that, when the contacts 27—41 close, the tube 42 is by-passed to lower the current flow therethrough to the extent that the tube no longer glows.

The tube 42 and the resistance 63 are mounted on an extension of the base 20 and are enclosed by a cabinet 47, which abuts the side walls 21 and the top member 22 and extends to the right (Fig. 2), but which is provided with an opening 48 through which the top of the glow-discharge tube projects so that it is visible to the operator.

Operation

The spring 50, the strength of which is to be gauged, is inserted into an opening 51 in the top member 22, whereby it comes to rest on the floating switch member 37 and extends above the top of the member 22. In gauging the spring, the operator compresses the spring until the top coil thereof is level with the top of the member 22. Any flat piece of material can be used to compress the spring, and such member can be hinged to the member 22 if desired. A convenient means for accomplishing this purpose is shown in Fig. 3 and consists of a rubber finger stall 55 having fast thereto a flat plate 56 which can be used on the finger of the operator.

It may be mentioned here that the switch plate 37 has a sheet of rubber 57 cemented to the upper side thereof to insulate the switch plate 37 from the spring 50 to avoid injury to the operator.

The spring 38 is of such a strength that, if the spring 50 being gauged exceeds the lowest acceptable strength, the spring 38 will be compressed by the switch plate 37 when the pressure is applied to the latter by the compressed spring 50, thus closing contacts 26—40 and causing the tube 42 to glow. The spring 39 is of such a strength that, if the strength of the spring 50 being tested does not exceed the maximum acceptable strength, the contacts 27—41 will not close. Thus, if the spring 50 being tested comes within the acceptable range of strength, the tube 42 indicates that fact by glowing. However, if the spring 50 being tested exceeds the maximum acceptable strength, the spring 39 is compressed, and the contacts 27—41 are closed to by-pass the tube 42. At this time, the contacts 26—40 are also closed, and therefore the current flows from the power supply line, through resistance 63, lead 49, contacts 27—41, switch plate 37, contacts 26—40, and lead 46, to the point 45 on the supply line. This circuit reduces the flow of current through the glow-discharge tube 42 to the extent that the tube no longer glows. This indicates that the spring is too strong to be acceptable.

On the other hand, if the spring is too weak to be acceptable, the springs 38 and 39 are not compressed, and therefore the contacts 26—40 and 27—41 remain open, with the result that the tube 42 does not glow.

The screws 34 are adjustable to vary the pressure required to compress springs 38 and 39. Openings are provided in the base 20 to render these screws accessible.

It will be apparent that springs of varying length or strength can be gauged with the invention as described. The variable element is the thickness of the top member 22, which must be made according to the length and amount of compression of the spring 50. The springs 38 and 39 can be adjusted to meet the correct requirements by means of the adjusting screws 34.

It has been found that, when a one-fourth-watt neon lamp is used in the circuit, the resistance which operates satisfactorily is one of 2,000 ohms, when 115 volts are used on the power line.

Modified forms

If desired, the device can be constructed with both sets of switch contacts normally closed. In this form, the opening of one set of switch contacts will cause the tube 42 to glow, and the opening of both sets of switch contacts will extinguish the glow. In this form of the invention, the stationary contacts 26 and 27 are located above the floating switch plate 37.

Another form of the invention is shown schematically in Fig. 5. This form of the invention is arranged to gauge the strength of a tension spring 64. In this form of the invention, one end of the spring 64 is hooked onto the floating switch plate 37, and the other end is hooked onto a key lever 65 having a finger piece 66 for convenience in operating the device. The key lever 65 is pivoted on the base 20 and is provided with an adjustable limit stop 67. The operation of this form of the invention is the same as that of the form described above.

The schematic illustration shown in Fig. 6 illustrates the form of the invention when the contacts 26—40 and 27—41 are normally closed.

The schematic illustration shown in Fig. 7 illustrates still another form of the invention, in which the floating contact 37 of the forms shown in Figs. 1 to 5 is made of two separate members, 73 and 74, each controlled by a spring 38 and 39, respectively. This form is also arranged to gauge tension springs, and in its use the spring 64 is hooked between the switch members 73 and 74. If the spring 64 being gauged is strong enough to compress spring 38, the contacts 26—40 are opened. This causes the maximum flow of current through the tube 42 to cause the tube to glow. If the spring 64 is not strong enough to open contacts 26—40, the flow of current is by-passed through the switch contacts 26—40 and the switch plate 73, with the result that the flow of current through the tube 42 is not sufficient to cause the tube to glow. If the spring 64 is strong enough to open both sets of switch contacts, 26—40 and 27—41, then the flow of current is interrupted through the tube 42, and therefore the tube is extinguished.

The form of the invention shown in Fig. 7— that is, the form in which the floating switches are operated from the opposite ends of the springs under test—is particularly well adapted to springs of small strength, whereas the form of the invention shown in Figs. 4 and 5 is better suited for testing springs of greater strength.

As illustrated in the drawings, the springs 50 and 64 are shown as applying force on the member 37 at a point midway between the supporting springs 38 and 39, and the springs 38 and 39 are described as being of the same strength. The scope of the invention is not limited to this application, since the device will operate equally effectively when the force is applied on the member 37 anywhere between the springs 38 and 39, and in this event the springs 38 and 39 are adjusted, or they are made of the required strengths; that is, one spring may be stronger than the other. The form which the invention will take depends on the characteristics of the spring being gauged. For example, the acceptable limits can be extended a greater or lesser extent by varying the strengths of the springs 38 and 39 and by changing the location of the opening 51 so that the member 37 will be operated by the spring being gauged at a position other than midway between its ends.

As illustrated, the signal device is shown to be a glow tube. The invention is not limited to this form of signal device, since any form of signal device can be utilized. For example, a bell, a buzzer, or any electrically operated device can be substituted for the glow tube.

The force applied to the member 37 can be any force; for example, the force of gravity instead of the force of a spring. Therefore, the device can be utilized in gauging the weights of articles. If an article must fall between a maximum weight and a minimum weight, the top plate 22 is constructed to guide such article onto the member 37 at the predetermined point, and the signal device is operated by the weight of the article. If the weight is sufficient to overcome the spring 38, but not sufficient to overcome the spring 39, the article is of the acceptable range in weight.

While the forms of mechanism herein shown and described are admirably adapted to fulfill the objects primarily stated, it is to be understood that it is not intended to confine the invention to the forms or embodiments herein disclosed, for it is susceptible of embodiment in various other forms all coming within the scope of the claims which follow.

What is claimed is:

1. In a device for gauging the strength of springs, a glow-discharge tube, a floating switch member having a plurality of switch contacts, one of said contacts being in circuit with the glow-discharge tube and the other switch contacts being in a circuit by-passing the glow-discharge tube, a plurality of stationary switch members cooperable with said contacts, two springs of different strength supporting said floating switch member at opposite ends of the latter, and means to guide a spring being gauged into contact with the switch member at a point intermediate the switch contacts so that the switch contact is actuated by the spring under test to cause the first-named one of said contacts on the floating switch member to make contact with one of the stationary switch members when the spring under test exceeds a minimum of acceptable strength to cause the glow-discharge tube to glow, and to cause the second-named one of said contacts on the floating member to make contact with another stationary switch member when said spring under test exceeds a maximum of acceptable strength to cause the glow-discharge tube to become extinguished.

2. In a device to gauge the strength of springs, a signal device; an electric circuit to operate the signal device; a shunt circuit around the signal device; a switch in each one of said circuits to control the flow of electric current through said circuits; a spring to support one element of one switch; a spring to support one element of the other switch, the last-named supporting spring being stronger than the first-named supporting spring, the switch element supported by the first-named supporting spring being located in the first-named circuit to close the circuit through the signal device to indicate when the strength of the spring being gauged exceeds the minimum of acceptable strength, and the switch element supported by the second-named supporting spring being located in the shunt circuit to render the signal device ineffective when the strength of the spring being gauged exceeds the maximum of acceptable strength; and means whereby the spring being gauged is guided into position to coact with and to operate the switch elements in a direction opposed to the force of the supporting springs and in accordance with the strength of the spring being gauged.

3. In a device to gauge the strength of springs, a signal device; circuits to activate the signal device; means to operate the signal device including a member operable by a spring being gauged; two flexible means, one adjacent each of the opposite ends of said member, one of said flexible means capable of being flexed in response to a certain pressure when applied thereto, the other of said flexible means capable of being flexed in response to a greater pressure when applied thereto; and guiding means to guide the spring being gauged into contact with said member intermediate its ends when said spring is compressed in the operation of gauging its strength, the force applied to said member by the act of compressing the spring being gauged acting to lower the end of the member adjacent the first-named flexible means to close a circuit through the signal device when the strength of the spring being gauged exceeds the minimum acceptable strength, and said force applied to said member by the act of compressing the spring being gauged acting to lower the other end of the member which is adjacent the second-named flexible means to close a circuit around the signal device, when the strength of the spring being gauged exceeds the maximum acceptable strength, the two flexible means having resistance value such as to operate the signal means to signal when the strength of the spring being tested equals a standard ranging between a minimum strength and a maximum strength.

4. In a spring-gauging device, an electrically operated signal means; electrical circuits; a switch member to control the circuits; a contact at each end of the switch member; a spring adjacent each contact acting to support the two ends of the switch member, one of said springs being stronger than the other; a separate stationary switch contact cooperating with each of the contacts on the switch member; a guide member adjacent the switch member to guide a spring being gauged into contact with the switch member intermediate the ends of the switch member; and pilots to maintain cooperative relationship with the respective contacts, said pilots being of a size to permit one or both ends of the switch member to be lowered in response to the strength of the spring being gauged when the spring being gauged is compressed against the switch member, to thereby close one or both of the switch contacts to operate the signal means.

5. In a spring-gauging device, an electrically operated signal means; a switch member; a contact at each end of the switch member; a spring adjacent each contact acting to support the two ends of the switch member, one of said springs being stronger than the other; a separate stationary switch contact cooperating with each one of the contacts on the switch member; a guide member adjacent the switch member to guide a spring being gauged into contact with the switch member intermediate the ends of the switch member; pilots to maintain cooperative relationship with the respective contacts, said pilots being of a size to permit one or both ends of the switch member to be lowered in response to the strength of the spring being gauged when the spring being gauged is compressed against the switch member, to thereby close one or both of the switch contacts to operate the signal means; and adjustable means coacting with each spring to adjust the tension thereof to vary the operation of the switch member in accordance with the acceptable limits of strength of the spring being tested.

6. In a spring-gauging device, an electrically operated signal means; a switch member; a contact at each end of the switch member; a spring adjacent each contact acting to support the two ends of the switch member, one of said springs being stronger than the other; a separate stationary switch contact cooperating with each one of the contacts on the switch member; a guide member adjacent the switch member to guide a spring being gauged into contact with the switch member intermediate the ends of the switch member; pilots to maintain cooperative relationship with the respective contacts, said pilots being of a size to permit one or both ends of the switch member to be lowered in response to the strength of the spring being gauged when the spring being gauged is compressed against the switch member, to thereby close one or both of the switch contacts to operate the signal means; adjustable means coacting with each spring to adjust the tension thereof to vary the operation of the switch member in accordance with the acceptable limits of strength of the spring being tested; and a stationary member having threaded openings to support the adjustable means.

7. In a spring-gauging device, an electrically operated signal means; a switch member; a contact at each end of the switch member; a spring adjacent each contact acting to support the two ends of the switch member, one of said springs being stronger than the other; a separate stationary switch contact cooperating with each one of the contacts on the switch member; a guide member adjacent the switch member to guide a spring being gauged into contact with the switch member intermediate the ends of the switch member; pilots to maintain cooperative relationship with the respective contacts, said pilots being of a size to permit one or both ends of the switch member to be lowered in response to the strength of the spring being gauged when the spring being gauged is compressed against the switch member, to thereby close one or both of the switch contacts to operate the signal means; a frame having threaded openings therein, said pilots having a threaded portion engaging the threaded openings for adjusting the pilots; and shoulders on the pilots to engage the switch member supporting springs, said shoulders acting to alter the tension of the switch member supporting springs when the threaded portions are adjusted within the openings to vary the acceptable limits of strength of the springs being gauged.

8. In a device for gauging the strength of springs, a stationary supporting member; switch contacts supported by said member; shouldered adjusting means carried by said member; a movable switch member having contacts cooperable with the first-named contacts; springs between the shoulders and one side of the switch member; a guide means adjacent the switch member acting to receive the thrust of the switch member caused by the force of said springs; and an opening in the guide member to guide a spring being gauged into contact with the switch member intermediate the ends of the switch member when the spring being gauged is compressed to exert a force on the switch member in opposition to the force exerted by the first-named springs, said first-named springs being of different strengths to control the movement of the ends of the switch member sequentially to cause one or both of the contacts on the switch member to engage the first-named contacts to sequentially control the effectiveness and ineffectiveness of the signal means, depending on the strength of the spring being gauged.

9. In a device for gauging the strength of springs, a glow-discharge tube, an electrical circuit through said glow-discharge tube, another electrical circuit by-passing said glow-discharge tube, a switch in each of said circuits, a differentially movable member supporting one element of each of said switches, a spring of a certain resiliency supporting the differentially movable member at one point, another spring of a resiliency different from the resiliency of the first-named spring to support the differential member at another point, and means, acting through a spring being tested, to differentially move said means by biasing said supporting springs, said differentially movable member being thereby differentially movable one extent by a spring being tested to close the circuit through the glow-discharge tube to cause the glow-discharge tube to glow when the spring under test exceeds a minimum of acceptable strength and movable a greater extent to close both of said circuits to extinguish the glow-discharge tube when the strength of the spring under test exceeds a maximum of acceptable strength.

10. In a device for testing the strength of springs, a glow-discharge tube; an electrical circuit including a resistance to control the activity of the glow-discharge tube; a shunt circuit around the glow-discharge tube; a switch in said electrical circuit; a switch in the shunt circuit; two resilient means, one to control each of said switches, one of said resilient means having greater strength than the other; and means, acting through the spring being tested, to operate said switches to overcome the respective resilient means in such a manner that one switch is operated when the strength of a spring under test exceeds the minimum of acceptable strength and the other switch is operated when the strength of said spring under test exceeds the maximum of acceptable strength, to cause the tube to glow only when the strength of the spring under test is between the minimum and the maximum of acceptable strengths.

WALTER HOMAN.
ROGER S. HULL.